(12) United States Patent
Zhang et al.

(10) Patent No.: US 11,586,849 B2
(45) Date of Patent: Feb. 21, 2023

(54) MITIGATING STATISTICAL BIAS IN ARTIFICIAL INTELLIGENCE MODELS

(71) Applicant: International Business Machines Corporation, Armonk, NY (US)

(72) Inventors: Yunfeng Zhang, Chappaqua, NY (US); Rachel Katherine Emma Bellamy, Bedford, NY (US); Kush Raj Varshney, Ossining, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 476 days.

(21) Appl. No.: 16/745,872

(22) Filed: Jan. 17, 2020

(65) Prior Publication Data
US 2021/0224605 A1    Jul. 22, 2021

(51) Int. Cl.
*G06K 9/62* (2022.01)
*G06N 20/00* (2019.01)

(52) U.S. Cl.
CPC .......... *G06K 9/6262* (2013.01); *G06K 9/624* (2013.01); *G06K 9/6227* (2013.01); *G06N 20/00* (2019.01)

(58) Field of Classification Search
CPC .... G06K 9/6262; G06K 9/6227; G06K 9/624; G06N 20/00; G06N 3/126; G06N 7/005; G06N 5/003; G06N 20/20
See application file for complete search history.

(56) References Cited

U.S. PATENT DOCUMENTS

| | | | |
|---|---|---|---|
| 6,625,709 B2 | 9/2003 | Aiken et al. | |
| 7,230,991 B2 | 6/2007 | Sang et al. | |
| 8,135,994 B2 * | 3/2012 | Keromytis | G06F 21/577 |
| | | | 714/38.11 |
| 8,909,567 B2 | 12/2014 | Kang | |
| 9,678,796 B2 | 6/2017 | Mukherjee et al. | |

(Continued)

FOREIGN PATENT DOCUMENTS

| | | |
|---|---|---|
| CN | 109377014 A | 2/2019 |
| EP | 3483797 A1 | 5/2019 |
| KR | 20180052093 A | 5/2018 |

OTHER PUBLICATIONS

Barocas, et al. "Fairness and Machine Learning." https://fairmlbook.org, Last Accessed Jan. 14, 2020. 181 pages.
(Continued)

*Primary Examiner* — Siamak Harandi
(74) *Attorney, Agent, or Firm* — Amin, Turocy & Watson, LLP

(57) ABSTRACT

Techniques regarding mitigating bias in one or more machine learning models are provided. For example, one or more embodiments described herein can comprise a system, which can comprise a memory that can store computer executable components. The system can also comprise a processor, operably coupled to the memory, and that can execute the computer executable components stored in the memory. The computer executable components can comprise a model component that can evaluate a machine learning model at a plurality of threshold settings to generate a sample set and can define a relationship between a fairness metric and a utility metric of the machine learning model based on the sample set.

19 Claims, 14 Drawing Sheets
(2 of 14 Drawing Sheet(s) Filed in Color)

(56) References Cited

U.S. PATENT DOCUMENTS

| | | |
|---|---|---|
| 9,727,826 B1 | 8/2017 | Lindstrom |
| 2013/0091035 A1 | 4/2013 | Kota et al. |
| 2018/0121817 A1 | 5/2018 | Datta |
| 2019/0057356 A1 | 2/2019 | Larsen et al. |

OTHER PUBLICATIONS

Edwards, et al. "SMARTS and SMARTER: Improved Simple Methods for Multiattribute Utility Measurement." Organizational Behavior and Human Decision Processes, 60(3), 306-325. 20 pages.

Saaty. "A scaling method for priorities in hierarchical structures." Journal of Mathematical Psychology, 15(3), 234-281. 1977. 48 pages.

Bergstra, et al. "Making a Science of Model Search: Hyperparameter Optimization in Hundreds of Dimensions for Vision Architectures." In Proceedings of the 30th International Conference on International Conference on Machine Learning—vol. 28 (pp. I-115-I-123), 2013. 9 pages.

Salmon, et al. "Optimized Pre-Processing for Discrimination Prevention." Advances in Neural Information Processing Systems 30 (pp. 3992-4001). 2017. 10 pages.

Hardt, et al. "Equality of Opportunity in Supervised Learning." Advances in Neural Information Processing Systems 29 (pp. 3315-3323). 22 pages.

Ossadnik, et al. "Group Aggregation Techniques for Analytic Hierarchy Process and Analytic Network Process: A Comparative Analysis" Group Decis Negot (2016) 25:421-457, DOI 10.1007/s10726-015-9448-4. 37 pages.

Bellamy, et al. "AI Fairness 360: An Extensible Toolkit for Detecting, Understanding, and Mitigating Unwanted Algorithmic Bias." arXiv:1810.01943v1 [cs.AI] Oct. 3, 2018. 20 pages.

"Classification Metric" aif360, https://aif360.readthedocs.io/en/latest/modules/metrics.html#classification-metric. Last Accessed Jan. 15, 2020. 20 pages.

Bottomley, et al. "A comparison of three weight elicitation methods: good, better, and best." Omega 29, 6 (2001), 553-560., https://doi.org/10.1016/S0305-0483(01)00044-5. 8 pages.

Cabrera, et al. "Discovering Intersectional Bias in Machine Learning." Presented at ICLR 2019 Debugging Machine Learning Models Workshop. 6 pages.

Chouldechova. "Fair Prediction with Disparate Impact: A Study of Bias in Recidivism Prediction Instruments." Big Data 5, 2 (Jun. 2017), 153-163. https://doi.org/10.1089/big.2016.0047 arXiv:1703.00056. 11 pages.

Dolan. "Multi-Criteria Clinical Decision Support." The Patient: Patient-Centered Outcomes Research vol. 3, pp. 229-248(2010). 20 pages.

Dua, et al. "UCI Machine Learning Repository." http://archive.ics.uci.edu/ml, Last Accessed Jan. 13, 2020. 2 pages.

Kamiran, et al. "Classifying without discriminating." 2009 2nd International Conference on Computer, Control and Communication. 6 pages.

Ke, et al. "LightGBM: A Highly Efficient Gradient Boosting Decision Tree." 31st Conference on Neural Information Processing Systems (NIPS 2017),. 9 pages.

Kleinberg, et al. "Inherent Trade-Offs in the Fair Determination of Risk Scores." arXiv:1609.05807v2 [cs.LG] Nov. 17, 2016. 23 pages.

Liberatore, et al. "The analytic hierarchy process in medical and health care decision making: A literature review." European Journal of Operational Research, vol. 189, Issue 1, Aug. 16, 2008, pp. 194-207. 14 pages.

Mell, Peter, et al. "The NIST Definition of Cloud Computing." National Institute of Standards and Technology. Sep. 2011. 7 pages.

\* cited by examiner

800

Which one is more important?

⦿ Increase profit per applicant by $100
◯ Reduce the difference between young and aged people's loan approval rate by 10%

How many times more important?

1  9 | 2 |

Which one is more important?

⦿ Increase profit per applicant by $100
◯ Reduce the difference in the system's accuracy between young and aged people's by 10%

How many times more important?

1  9 | 1 |

Which one is more important?

◯ Reduce the difference between young and aged people's loan approval rate by 10%
⦿ Reduce the difference in the system's accuracy between young and aged people's by 10%

How many times more important?

1  9 | 2 |

|  | AHP ratings | | | Weights | | | Optimal Thresholds | | Metrics | | |
| --- | --- | --- | --- | --- | --- | --- | --- | --- | --- | --- | --- |
|  | Util. vs. SPD | Util. vs. WAOD | SPD vs. WAOD | $W_{util}$ | $W_{SPD}$ | $W_{WAOD}$ | Young | Aged | Util | SPD | WAOD |
| Max Util. | 9 | 9 | 1 | 0.82 | 0.09 | 0.09 | 95.0% | 92.7% | $130 | -0.06 | 0.11 |
| Min $|SPD|$ | 1/9 | 1 | 9 | 0.09 | 0.82 | 0.09 | 84.4% | 85.9% | $40 | 0 | 0.14 |
| Min $|WAOD|$ | 1 | 1/9 | 1/9 | 0.09 | 0.09 | 0.82 | 50.9% | 47.4% | -$250 | -0.08 | 0 |
| Balanced | 1 | 2 | 2 | 0.4 | 0.4 | 0.2 | 95.1% | 94.6% | $110 | -0.01 | 0.14 |

FIG. 9

MITIGATING STATISTICAL BIAS IN ARTIFICIAL INTELLIGENCE MODELS

BACKGROUND

The subject disclosure relates to implementing one or more fairness policies in artificial intelligence ("AI") models to mitigate statistical bias, and more specifically, to optimizing one or more AI models based on one or more user defined preferences regarding one or more fairness and/or utility metrics.

AI systems are already working alongside humans as trusted advisors in high-stakes decision-making applications such as mortgage lending and/or employment practices. In these domains, fairness is an important concern. Decisions in these domains are social constructions, and as such need to incorporate multiple viewpoints. Current AI technology does not readily allow for inclusion of viewpoints from those other than the developer of the AI model. The need for deep technical expertise is a barrier to participation for people outside of technical domains.

Machine learning, the most common form of AI today, is inherently a form of statistical discrimination. The discrimination can become objectionable to one or more users when it places certain groups represented by the data at systematic advantage and other groups represented by the data at systematic disadvantage. AI researchers have produced algorithms that can reduce bias; however, fairness is not a purely algorithmic concept, but a societal one. Ensuring fairness in AI decision making is not just a matter of creating new algorithms that are "fairer"; rather it is an iterative and interactive process that involves multiple stakeholders.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatuses and/or computer program products that can implement one or more fairness policies to optimize one or more machine learning models are described.

According to an embodiment, a system is provided. The system can comprise a memory that can store computer executable components. The system can also comprise a processor, operably coupled to the memory, and that can execute the computer executable components stored in the memory. The computer executable components can comprise a model component that can evaluate a machine learning model at a plurality of threshold settings to generate a sample set and can define a relationship between a fairness metric and a utility metric of the machine learning model based on the sample set. An advantage of such a system can be the incorporation of policy makers' preferences into bias mitigation of the machine learning model.

In some examples, the fairness metric can be comprised within a plurality of fairness metrics. Also the system can further comprise a metric component that can define the fairness metric as an independence criterion of the machine learning model. Also, the metric component can further define a second fairness metric from the plurality of fairness metrics as a separation criterion of the machine learning model. An advantage of such a system can be that the machine learning model can be jointly optimized based on multiple fairness metrics.

According to an embodiment, a computer-implemented method is provided. The computer-implemented method can comprise determining, by a system operatively coupled to a processor, a threshold setting for a machine learning model based on preferential weight values assigned to a fairness metric and a utility metric of the machine learning model. An advantage of such a computer-implemented method can be that the machine learning model can be optimized while satisfying one or more fairness constraints preferred by one or more policy makers.

In some examples, the computer-implemented method can further comprise executing, by the system, a decision analysis algorithm to generate an inquiry that elicits the preferential weight values. Also, the computer-implemented method can comprise executing, by the system, an optimization algorithm to determine the threshold setting. An advantage of such a computer-implemented method can be that one or more policy makers can establish a preferred balance between one or more fairness metrics (e.g., independence and/or separation) and model utility.

According to an embodiment, a computer program product for mitigating bias in a machine learning model is provided. The computer program product can comprise a computer readable storage medium having program instructions embodied therewith. The program instructions can be executable by a processor to cause the processor to evaluate, by the processor, the machine learning model at a plurality of threshold settings to generate a sample set and define a relationship between a fairness metric and a utility metric of the machine learning model based on the sample set. An advantage of such a computer program product can be a bias mitigation scheme for machine learning models that can adapt to changes in societal preferences (e.g., as expressed by one or more policy makers).

In some examples, the computer program instructions can further cause the processor to define, by the processor, the fairness metric from the fairness metric as an independence criterion of the machine learning model. Further, the computer program instructions can further cause the processor to define, by the processor, a second fairness metric from the plurality of fairness metrics as a separation criterion of the machine learning model. Also, the computer program instructions can further cause the processor to generate, by the processor, a visualization depicting a distribution of the sample set as a function of one or more of the plurality of fairness metrics, wherein the relationship is a trend in the distribution. An advantage of such a computer program product can be the generation of an interactive visualization tool that can facilitate an understanding of the relationship between fairness metrics and utility metrics within the machine learning model.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 8 illustrates a diagram of an example, non-limiting inquiry that can be generated by one or more systems to elicit user preferences regarding one or more fairness and/or utility metrics of a machine learning model in accordance with one or more embodiments described herein.

FIG. 9 illustrates a diagram of an example, non-limiting table that can demonstrate the efficacy of a system that can implement one or more fairness policies in optimizing one or more machine learning models in accordance with one or more embodiments described herein.

DETAILED DESCRIPTION

Figure 1:
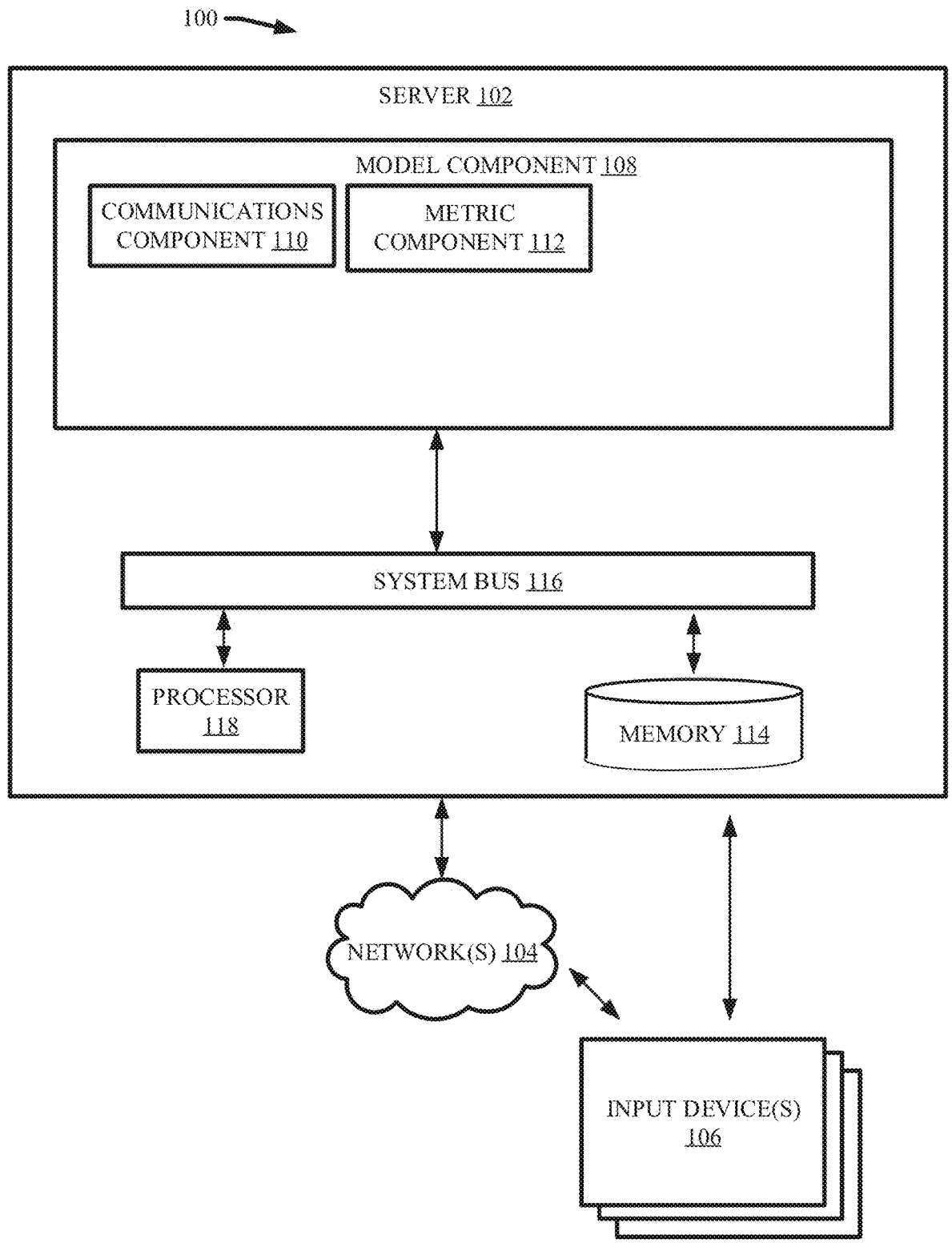
FIG. 1 illustrates a block diagram of an example, non-limiting system that can implement one or more fairness policies in optimizing one or more machine learning models in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Given the problems with other implementations of bias mitigation in machine learning models; the present disclosure can be implemented to produce a solution to one or more of these problems by applying one or more fairness policies in optimizing a machine learning model based on one or more user preferences regarding one or more fairness and/or utility metrics. Advantageously, one or more embodiments described herein can enable a machine learning model to be optimized to incorporate a user defined prioritization between one or more fairness metrics and/or utility metrics. For example, different fairness metrics of a machine learning model can conflict with each other, wherein reducing bias based on one metric can increase bias based on another metric. Various embodiments described herein can advantageously strike a balance between fairness criterion and model utility based on one or more policy preferences elicited from one or more policy makers.

Various embodiments of the present invention can be directed to computer processing systems, computer-implemented methods, apparatus and/or computer program products that facilitate the efficient and effective mitigation of bias within one or more machine learning models. For example, in one or more embodiments described herein can define a relationship between one or more fairness metrics and utility metrics within a machine learning model. Further, one or more embodiments can generate one or more visualizations depicting the defined relationship across a distribution of a sample set of the machine learning model at various threshold settings. Additionally, various embodiments can include eliciting user preferences regarding the one or more fairness and utility metrics to determine a threshold setting for the machine learning model. Thereby, one or more embodiments can optimize a machine learning model via the implementation of one or more user defined fairness policies that can mitigate statistical bias within the machine learning model.

In one or more embodiments, the computer processing systems, computer-implemented methods, apparatus and/or computer program products described herein can formally define one or more fairness metrics and/or utility metrics of a machine learning model with regards to a task objective. Additionally, one or more embodiments can include generating one or more visualizations that can depict a relationship between various fairness metrics and utility metrics to one or more policy makers. Further, one or more embodiments can comprise employing one or more formal decision analysis techniques to elicit the policy maker's preferential weight values on each metric of the machine learning model. Moreover, various embodiments can include determining one or more optimal machine learning model settings that can satisfy the policy maker's preferences.

The computer processing systems, computer-implemented methods, apparatus and/or computer program products employ hardware and/or software to solve problems that are highly technical in nature (e.g., mitigating statistical bias within one or more machine learning models), that are not abstract and cannot be performed as a set of mental acts by a human. For example, an individual, or even multiple individuals, cannot readily sample a machine learning model at a vast amount of threshold settings to generate one or more visualizations depicting a relationship between one or more fairness metrics and utility metrics. For instance, an individual cannot generate one or more visualizations in a fairness-utility virtual space from which one or more policy makers can interact with to understand how changes to one or more fairness metrics impact one or more utility metrics. Various embodiments described herein can constitute a technical improvement over conventional bias mitigation algorithms by enabling joint optimization of multiple model fairness metrics as well as model utility based on a policy maker's defined priorities and/or constraints. Further, one or more embodiments can include a technical improvement of traditional bias mitigation techniques by generating visualizations of the machine learning model in a fairness-utility virtual space that can delineate a relationship between the one or more fairness and utility metrics. Additionally, one or more embodiments described herein can demonstrate a practical application in optimizing machine learning models to mitigate statistical bias against one or more groups represented by the given data.

As used herein, the term "machine learning" can refer to an application of AI technologies to automatically and/or autonomously learn and/or improve from an experience (e.g., training data) without explicit programming of the lesson learned and/or improved. For example, machine learning tasks can utilize one or more algorithms to facilitate supervised learning to perform tasks such as classification and/or regression.

As used herein, the terms "machine learning model" and/or "machine learning models" can refer to a computer model that can be used to facilitate one or more machine learning tasks, wherein the computer model can simulate a number of interconnected processing units that can resemble abstract versions of neurons. For example, the one or more machine learning models can be neural network models comprising processing units that can be arranged in a plurality of layers (e.g., one or more input layers, one or more hidden layers, and/or one or more output layers) connected with by varying connection strengths (e.g., which can be commonly referred to within the art as "weights"). Neural network models can learn through training, wherein data with known outcomes is inputted into the computer model, outputs regarding the data are compared to the known outcomes, and/or the weights of the computer model are autonomous adjusted based on the comparison to replicate the known outcomes. As used herein, the term "training data" can refer to data and/or data sets used to train one or more machine learning models. As a machine learning model trains (e.g., utilizes more training data), the computer model can become increasingly accurate; thus, trained machine learning models can accurately analyze data with unknown outcomes, based on lessons learning from training data, to facilitate one or more machine learning tasks. Example machine learning models can include, but are not limited to: perceptron ("P"), feed forward ("FF"), radial basis network ("RBF"), deep feed forward ("DFF"), recurrent neural network ("RNN"), long/short term memory ("LSTM"), gated recurrent unit ("GRU"), auto encoder ("AE"), variational AE ("VAE"), denoising AE ("DAE"), sparse AE ("SAE"), markov chain ("MC"), Hopfield network ("HN"), Boltzmann machine ("BM"), deep belief network ("DBN"), deep convolutional network ("DCN"), deconvolutional network ("DN"), deep convolutional inverse graphics network ("DCIGN"), generative adversarial network ("GAN"), liquid state machine ("LSM"), extreme learning machine ("ELM"), echo state network ("ESN"), deep residual network ("DRN"), kohonen network ("KN"), support vector machine ("SVM"), neural turing machine ("NTM"), a combination thereof, and/or the like.

FIG. 1 illustrates a block diagram of an example, non-limiting system 100 that can mitigate bias in one or more machine learning models. Repetitive description of like elements employed in other embodiments described herein is omitted for sake of brevity. Aspects of systems (e.g., system 100 and the like), apparatuses or processes in various embodiments of the present invention can constitute one or more machine-executable components embodied within one or more machines (e.g., embodied in one or more computer readable mediums (or media) associated with one or more machines). Such components, when executed by the one or more machines, e.g., computers, computing devices, virtual machines, etc. can cause the machines to perform the operations described.

As shown in FIG. 1, the system 100 can comprise one or more servers 102, one or more networks 104 and/or input devices 106. The server 102 can comprise model component 108. The model component 108 can further comprise communications component 110 and/or metric component 112. Also, the server 102 can comprise or otherwise be associated with at least one memory 114. The server 102 can further comprise a system bus 116 that can couple to various components such as, but not limited to, the model component 108 and associated components, memory 114 and/or a processor 118. While a server 102 is illustrated in FIG. 1, in other embodiments, multiple devices of various types can be associated with or comprise the features shown in FIG. 1. Further, the server 102 can communicate with one or more cloud computing environments.

The one or more networks 104 can comprise wired and wireless networks, including, but not limited to, a cellular network, a wide area network (WAN) (e.g., the Internet) or a local area network (LAN). For example, the server 102 can communicate with the one or more input devices 106 (and vice versa) using virtually any desired wired or wireless technology including for example, but not limited to: cellular, WAN, wireless fidelity (Wi-Fi), Wi-Max, WLAN, Bluetooth technology, a combination thereof, and/or the like. Further, although in the embodiment shown the model component 108 can be provided on the one or more servers 102, it should be appreciated that the architecture of system 100 is not so limited. For example, the model component 108, or one or more components of model component 108, can be located at another computer device, such as another server device, a client device, etc.

The one or more input devices 106 can comprise one or more computerized devices, which can include, but are not limited to: personal computers, desktop computers, laptop computers, cellular telephones (e.g., smart phones), computerized tablets (e.g., comprising a processor), smart watches, keyboards, touch screens, mice, a combination thereof, and/or the like. The one or more input devices 106 can be employed to enter data (e.g., preferences regarding one or more fairness and/or utility metrics of a machine learning model) into the system 100, thereby sharing (e.g., via a direct connection and/or via the one or more networks 104) said data with the server 102. For example, the one or more input devices 106 can send data to the communications component 110 (e.g., via a direct connection and/or via the one or more networks 104). Additionally, the one or more input devices 106 can comprise one or more displays that can present one or more outputs generated by the system 100 to a user. For example, the one or more displays can include, but are not limited to: cathode tube display ("CRT"), light-emitting diode display ("LED"), electroluminescent display ("ELD"), plasma display panel ("PDP"), liquid crystal display ("LCD"), organic light-emitting diode display ("OLED"), a combination thereof, and/or the like.

In various embodiments, the one or more input devices 106 and/or the one or more networks 104 can be employed to input one or more settings and/or commands into the system 100. For example, in the various embodiments described herein, the one or more input devices 106 can be employed to operate and/or manipulate the server 102 and/or associate components. Additionally, the one or more input devices 106 can be employed to display one or more outputs (e.g., displays, data, visualizations, and/or the like) generated by the server 102 and/or associate components. Further, in one or more embodiments, the one or more input devices 106 can be comprised within, and/or operably coupled to, a cloud computing environment.

In one or more embodiments, the model component 108 can evaluate one or more machine learning models at a plurality of threshold settings to generate a sample set and/or define a relationship between one or more fairness metrics and utility metrics of the machine learning model based on the sample set. Also, in one or more embodiments the metric component 112 can define the one or more fairness metrics and/or utility metrics of the machine learning model for a given task objective. For example, the metric component 112 can define one or more of the fairness metrics as an independence criterion of the machine learning model. In a further example, the metric component 112 can define one or more other fairness metrics as a separation criterion of the machine learning model.

Various fairness criteria of a machine learning model can be divided into three categories: independence, separation, and/or sufficiency. The independence criterion can require that all analyzed groups represented by the given data receive equal rate of favorable treatment by the machine learning model. This roughly corresponds to the notion of equity, wherein each data group, regardless on its context, can receive support to have an equal outcome. The separation criterion can require that the false positive rates and the false negative rates are similar across all groups represented by the given data. This roughly corresponds to the notion of equality, which entails that every data group is supported at the same level. Lastly, sufficiency can require that a machine learning classifier assigns a score to each data group that accurately captures the impact of all data attributes, even if that means some groups represented by the given data receive, on average, lower scores. With many classifiers, if the machine learning model is well trained on a large dataset and has high accuracy, the sufficiency criterion is automatically satisfied because they predict probabilities that are well calibrated to a data group's true probability. Thus, in one or more embodiments the metric component 112 can primarily focus on defining the first two fairness criteria. Also, various embodiments described herein can regard binary classification cases for the sake of simplicity, but one of ordinary skill in the art will recognize that multi-class classification techniques are also envisaged.

The independence criterion can be characterized by the metric component 112 in accordance with Equation 1 below.

$$P(\hat{Y}=1|G=a)=P(\hat{Y}=1|G=b) \quad (1)$$

Wherein "Y" can be a machine learning classifier's prediction, and/or "G" can be a demographic variable taken to be a protected attribute in the application domain. Assuming $\hat{Y}=1$ is the favorable outcome, Equation 1 states that the probability of favorable outcome can be the same between any two groups "a" and "b". Example metrics that can relate to this notion of fairness can include, but are not limited to: statistical parity difference, disparate impact ratio, a combination thereof, and/or the like. For instance, statistical parity difference can be the difference between the two sides of Equation 1. Also, disparate impact ratio can be the ratio of probability of favorable outcome for an unprivileged data group to that for a privileged data group. In various embodiments, the metric component 112 can employ multiple fairness metrics to measure and/or evaluate one or more independence criteria. Often, perfect independence cannot be achieved, and relaxation on the one or more criteria is allowed. Further, the degree of relaxation can vary from one domain to another and is context-dependent.

The separation criterion can be characterized by the metric component 112 in accordance with Equations 2-3 below.

$$P(\hat{Y}=1|\hat{Y}=1,G=a)=P(\hat{Y}=1|\hat{Y}=1,G=b) \quad (2)$$

$$P(\hat{Y}=1|\hat{Y}=0,G=a)=P(\hat{Y}=1|\hat{Y}=0,G=b) \quad (3)$$

Wherein "Y" can be the ground truth label. Equation 2 can indicate that the true positive rates can be the same across any two groups represented by the given data, while Equation 3 can indicate that the false positive rates can be the same. Example metrics for measuring deviations from the separation criterion can include, but are not limited to: average odds difference, a combination thereof, and/or the like. For instance, average odds difference can average the difference in true positive rates and false positive rates between the privileged data group and the unprivileged data group. In various embodiments, example metrics for measuring deviations from the independence criterion and/or separation criterion can include, but are not limited to: statistical parity difference, disparate impact ratio, average odds difference, entropy index, average absolute odds difference, coefficient of variation, theil index, binary confusion matrix, equal opportunity difference, error rate, false negative rate, false omission rate, false positive rate, true negative rate, true positive rate, negative predictive value, positive predictive value, number of false negatives, number of false positives, number of true negatives, number of true positives, performance measures, selection rate, a combination thereof, and/or the like.

For example, in one or more embodiments the metric component 112 can employ statistical parity difference ("SPD") to measure independence and/or a variant of the average odds difference to measure separation. For instance, SPD can be implemented for measuring independence where ratios are less stable when subjected to numeric optimization (e.g., due to quickly growing large values). Further, the metric component 112 can employ disparate impact ratio to filter out one or more machine learning model settings that do not satisfy one or more defined constraint thresholds (e.g., defined by one or more policy makers via the one or more input devices 106 and/or networks 104).

In one or more embodiments, the variant of the average odds difference can account for weight values assigned to false positive and negative errors. For example, the variant of the average odds difference can be a weighted average odds difference ("WAOD") characterized by Equation 4 below.

$$\frac{W_{FP}(FPR_p - FPR_{unp}) + W_{TP}(TPR_{unp} - TPR_p)}{W_{FP} + W_{TP}} \quad (4)$$

Wherein "p" can be a privileged data group, "unp" can be an unprivileged data group, "FPR" can be a false positive rate, "TPR" can be a true positive rate, "$W_{FP}$" and "$W_{TP}$" can be weight values for false positive and true positive errors. When a measure in accordance with Equation 4 is below zero, it can signal bias against the unprivileged data group; and otherwise, bias against the privileged data group.

Further, in one or more embodiments the model component 108 (e.g., via the communications component 110 and/or network 104) can receive one or more utility functions regarding the task objective of the machine learning model. For instance, one or more policy makers and/or developers of the machine learning model can employ the one or more input devices 106 to enter the utility function into the system 100. In various embodiments, the model component 108 can retrieve one or more utility function regarding the task objective of the machine learning model from the memory 114. The utility function can be specific to the task objective of the machine learning model and/or can be domain specific. One of ordinary skill in the art will readily recognize that a variety of user-defined utility functions can be implemented by the various embodiments described herein. The utility function can characterize one or more utility metrics of the machine learning model.

Figure 2:
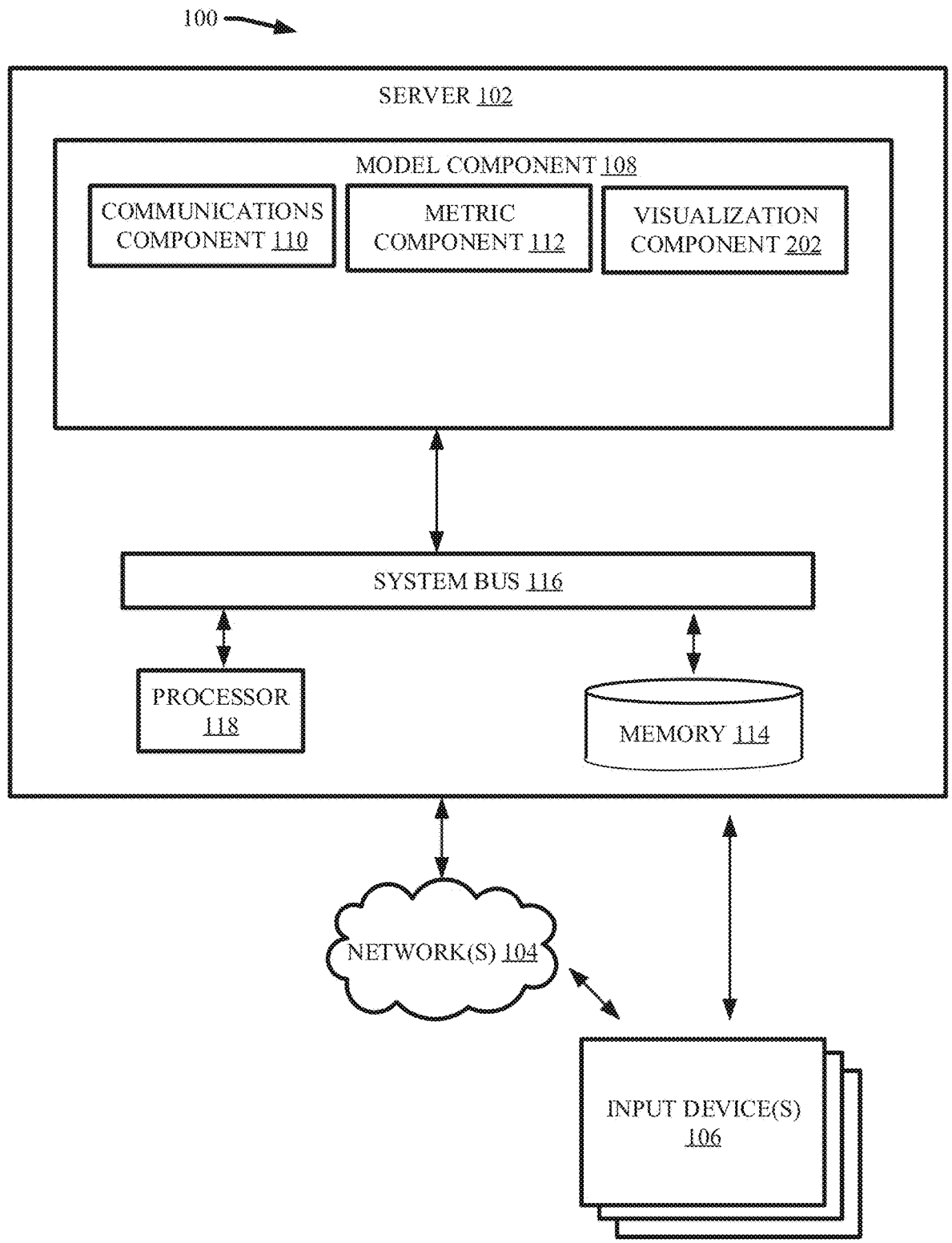
FIG. 2 illustrates a block diagram of an example, non-limiting system that can generate one or more visualizations depicting a relationship between one or more fairness metrics and/or utility metrics of a machine learning model in accordance with one or more embodiments described herein.

FIG. 2 illustrates a diagram of the example, non-limiting system 100 further comprising visualization component 202 in accordance with one or more embodiments described herein. Repetitive description of like elements employed in other embodiments described herein is omitted for sake of brevity. In various embodiments, the visualization component 202 can generate one or more visualizations that can depict one or more relationships between the one or more fairness metrics and/or utility metrics of the machine learning model. In one or more embodiments, the visualizations can be displayed to one or more policy makers via the one or more input devices 106 and/or networks 104.

For example, in one or more embodiments, the visualization component 202 can evaluate a plurality of threshold settings for the machine learning model to generate one or more sample sets comprising various versions of the machine learning model. Further, the visualization component 202 can generate one or more visualizations of a fairness-utility space, wherein the various versions comprised within the sample set can be distributed within the fairness-utility virtual space. One or more trends in the distribution of the sample set within the fairness-utility virtual space can characterize one or more relationships between the one or more fairness and/or utility metrics (e.g., defined and/or measured by the metric component 112).

For instance, in one or more embodiments the visualization component 202 can sample (e.g., randomly) a range of threshold settings for a machine learning classifier. For each threshold setting, the metric component 112 can calculate an independence-separation-utility triplet. Additionally, each threshold setting can be a pair of thresholds, such as classification thresholds, designated for unprivileged groups represented by the given data and privileged groups represented by the given data separately.

In various embodiments, the visualization component 202 can plot the independence-separation-utility triplets of the sample set in a fairness-utility virtual space to depict a distribution of the sample set. For example, the fairness-utility virtual space can be depicted as a graph; wherein the graph axis can include, but are not limited to: the threshold settings for the privileged and/or unprivileged groups represented by the given data, one or more fairness metrics, one or more utility metrics, a combination thereof, and/or the like. For instance, wherein the metric component 112 employs SPD and/or WAOD, the one or more visualizations generated by the visualization component 202 can depict how changing the thresholds (e.g., classification thresholds) can impact SPD, WAPD, and/or utility of the machine learning model.

In one or more embodiments, the visualization component 202 can proctor one or more policy makers (e.g., via the one or more input devices 106 and/or networks 104) to select one or more variables for which to analyze bias in the machine learning model. For example, the variables can regard one or more fairness criteria, such as independence and/or separation. The variables available for selection can depend on, for example: the task object of the machine learning model, available attributes in the dataset to be analyzed by the machine learning model, the domain of the machine learning model, a combination thereof, and/or the like.

Further, in one or more embodiments the visualization component 202 can proctor one or more policy makers (e.g., via the one or more input devices 106 and/or networks 104) to select one or more fairness metrics for which to analyze bias in the machine learning model. For example, the one or more fairness metrics can regard one or more techniques, algorithms, and/or technologies for measuring one or more fairness criteria (e.g., one or more selected variables). The one or more fairness metrics available for selection can be one or more fairness metrics defined by the metric component 112.

In various embodiments, the one or more visualizations generated by the visualization component 202 can be interactive (e.g., via the one or more input devices 106 and/or networks 104). For example, in one or more embodiments the one or more policy makers can interact (e.g., via the one or more input devices 106 and/or networks 104) with the one or more visualizations to filter data based on one or more of the fairness and/or utility metrics. For instance, one or more policy makers can interact with the one or more visualizations to remove and/or add configurations (e.g., threshold settings) based on one or more preference (e.g., remove configurations of the machine learning model that result in negative utility values). Further, in one or more embodiments the visualization component 202 can translate obtuse metric names into domain-based descriptions when generating the visualizations, variable selections, and/or metric selections to facilitate understanding by the one or more policy makers.

The one or more visualizations can serve as tools to inform one or more policy makers about the tradeoff relationships among the fairness and/or utility metrics; thereby enabling the one or more policy makers to express preferences on how to prioritize utility and fairness (e.g., independence and/or separation) in the machine learning model. In one or more embodiments, the one or more policy makers can manually select a configuration (e.g., setting of thresholds and/or analyzed metrics) from the sample set distribution in the fairness-utility space for implementation in the machine learning model.

Figure 3:
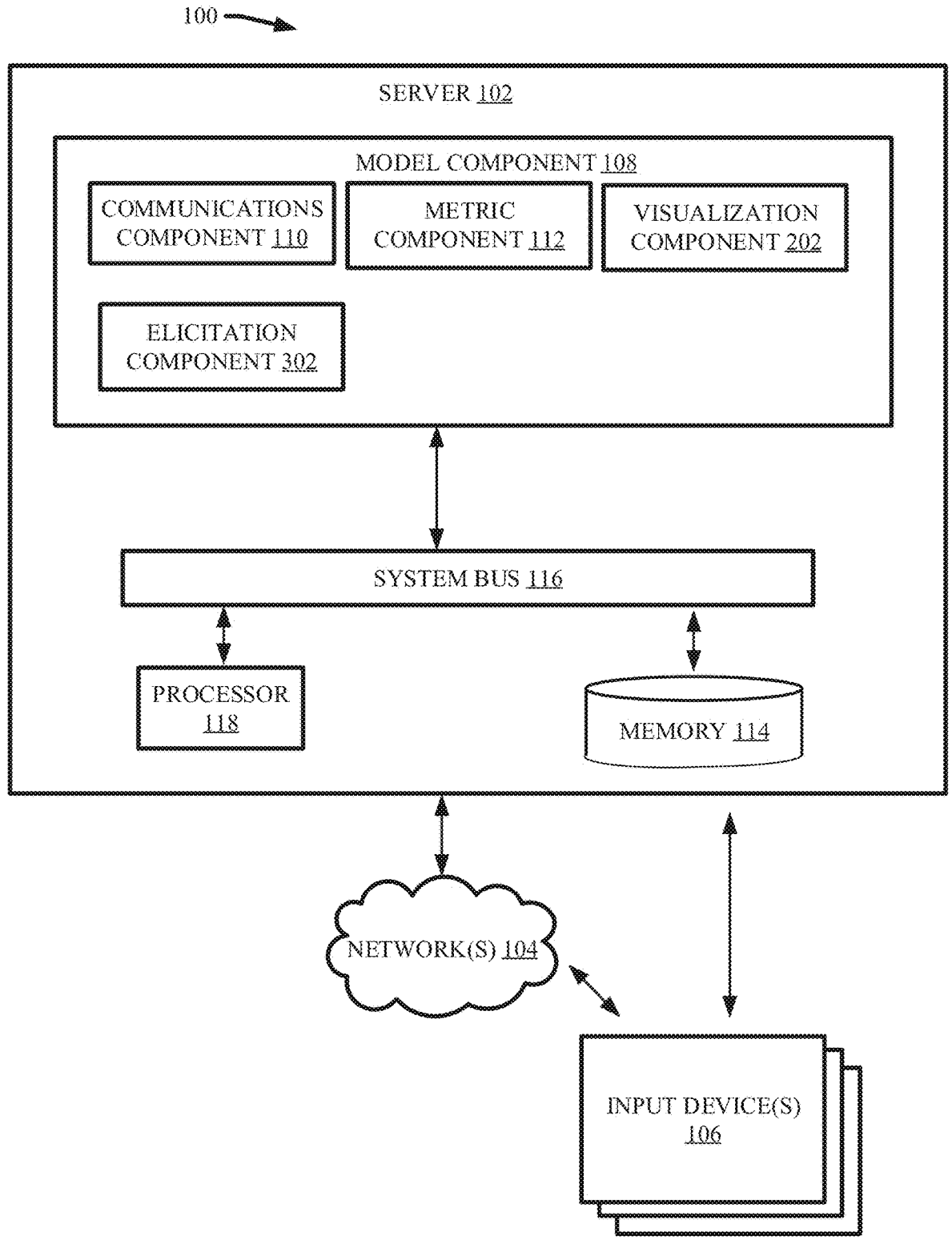
FIG. 3 illustrates a block diagram of an example, non-limiting system that can generate one or more inquiries to elicit user preferences regarding one or more fairness and/or utility metrics of a machine learning model in accordance with one or more embodiments described herein.

FIG. 3 illustrates a diagram of the example, non-limiting system 100 further comprising elicitation component 302 in accordance with one or more embodiments described herein. Repetitive description of like elements employed in other embodiments described herein is omitted for sake of brevity.

In various embodiments, the elicitation component 302 can execute one or more decision analysis algorithms to generate one or more inquiries regarding a prioritization of the one or more fairness and/or utility metrics. In one or more embodiments, the one or more inquiries can be displayed to one or more policy makers via the one or more input devices 106 and/or networks 104. Additionally, the one or more policy makers can employ the one or more input devices 106 and/or networks 104 to enter one or more responses to the one or more inquires into the system 100.

The visualizations can enable the one or more policy makers to see the relationship among the various metrics of the machine learning model (e.g., independence, separation, and/or utility). However, the visualizations show a sample (e.g., the sample set) of all the possible model configurations. There can be more optimal configurations outside the sample set depicted by the visualizations. To determine an optimal configuration for the machine learning model, numerical optimization methods (e.g., Bayesian optimization) can be employed, but require well defined optimization objectives. Therefore, the elicitation component 302 can elicit the one or more policy makers' relative weightings on the fairness and utility metrics so that the optimization objective can be defined.

In various embodiments, the elicitation component 302 can employ one or more decision analysis algorithms to elicit the policy maker's preferences. Example decision analysis algorithms can include, but are not limited to: an analytic hierarchy process ("AHP"), a conjoin analysis, a simple multi-attribute rating technique ("SMART"), direct weighting, SMART exploiting ranks, SMART using swings, a combination thereof, and/or the like.

In one or more embodiments, the elicitation component 302 can employ AHP to elicit one or more preferences (e.g., weight values) regarding the one or more fairness and/or utility metrics from the one or more policy makers. AHP can comprise the one or more policy makers comparing each pair of criterion, wherein the comparisons can be about a unit of one metric against a unit of another. These units can be somewhat comparable and/or intuitively comprehensible for the one or more policy makers. One way to determine the unit is to divide the range of each metric into equal number of intervals.

The elicitation component 302 can generate one or more inquiries to facilitate collection of the inputs for the one or more decision analysis algorithms. In various embodiments, the one or more inquiries can be presented to the one or more policy makers via one or more interactive displays (e.g., a web interface) using the one or more input devices 106 and/or networks 104. Further, in one or more embodiments the elicitation component 302 can translate obtuse metric names into domain-based descriptions when generating the inquiries to facilitate understanding by the one or more policy makers.

For example, the elicitation component 302 can utilize the AHP decision analysis algorithm and generate one or more inquires to be presented to one or more policy makers via one or more interactive web interfaces, wherein responses can be submitted on a numerical scale (e.g., a scale from 1 to 9). For instance, ratings submitted in response to one or more questions of the one or more inquires can be assembled into a matrix, such as the following:

$$\begin{bmatrix} 1 & a & b \\ 1/a & 1 & c \\ 1/b & 1/c & 1 \end{bmatrix}$$

Wherein "a, b, c" can represent the ratings assigned to three questions. Thereby, the elicitation component 302 can generate one or more matrices that can characterize one or more preferences and/or prioritizations defined by the one or more policy makers.

Additionally, in one or more embodiments the elicitation component 302 can execute one or more consistency checks on the responses provided by the one or more policy makers. For example, inconsistency can arise when the relationship implied by two comparisons conflicts with the result of another, direct comparison. For instance, wherein the metric component 112 employs SPD and WAOD; if utility is rated to be 9 times as important as SPD and 2 times as important as WAOD, this would imply that WAOD is about 4 times more important than SPD. However, if the policy maker rates that SPD is more important than WAOD, it would lead to a large inconsistency score. If a determine inconsistency score is greater than a defined inconsistency threshold, the elicitation component 302 can request the one or more policy makers to re-address the one or more inquiries.

In various embodiments, the elicitation component 302 can employ active-learning styled elicitation, in which the elicitation component 302 can iteratively asks the one or more policy makers to make local comparisons between many pairs of options to infer the weights on the fairness and/or utility metrics. Each comparison question can take the form of comparing one option with "x" utility, "y" SPD, and "z" WAOD to another option with "a" utility, "b" SPD, and "c" WAOD. Based on the response of the one or more policy makers, the elicitation component 302 can decide on the next pair of options that would gain maximum information on the preferences of the one or more policy makers.

Figure 4:
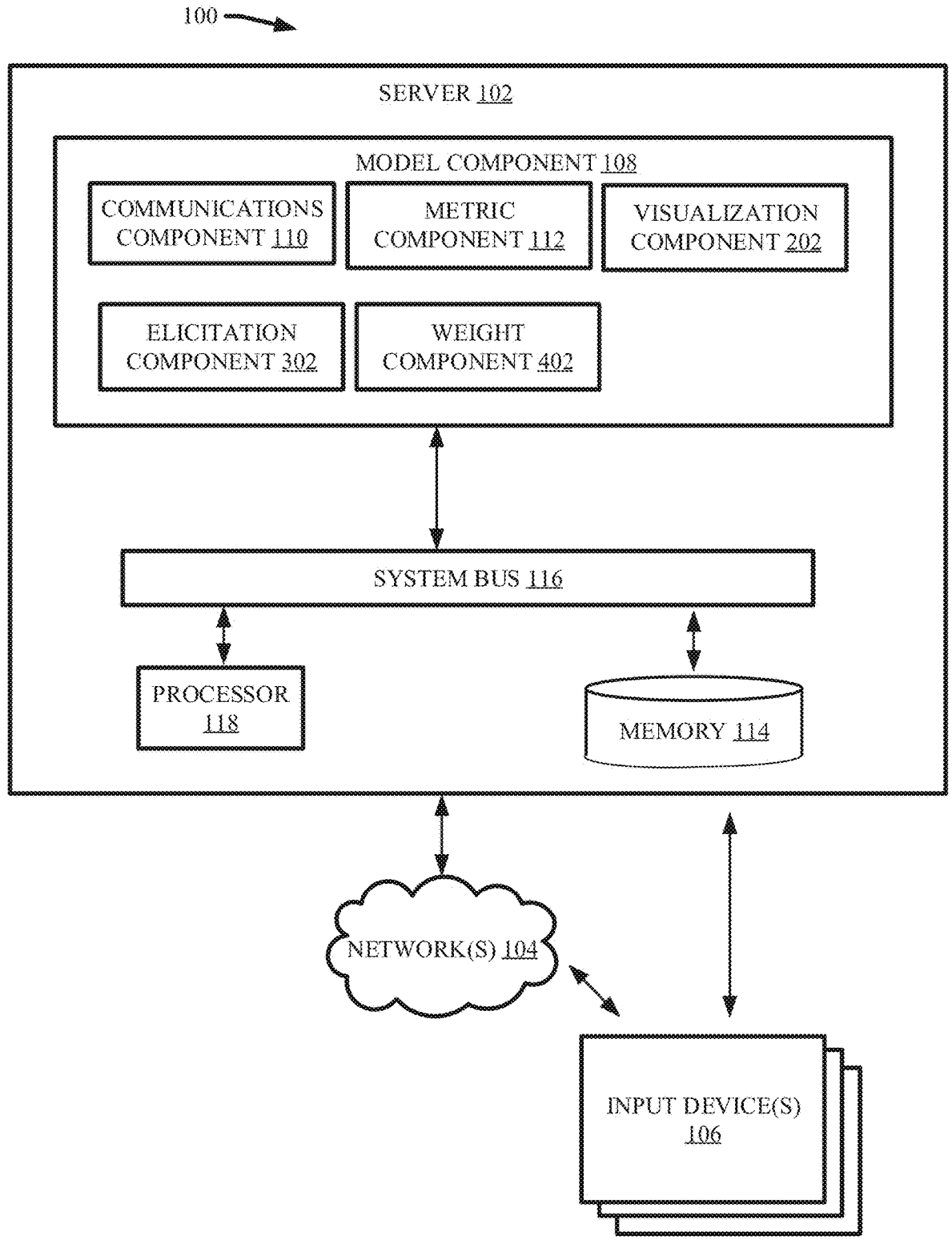
FIG. 4 illustrates a block diagram of an example, non-limiting system that can assign one or more mathematical weight values to one or more fairness and/or utility metrics of a machine learning model based on one or more user preferences in accordance with one or more embodiments described herein.

FIG. 4 illustrates a diagram of the example, non-limiting system 100 further comprising weight component 402 in accordance with one or more embodiments described herein. Repetitive description of like elements employed in other embodiments described herein is omitted for sake of brevity. In various embodiments, the weight component 402 can determine one or more weight values for the one or more fairness and/or utility metrics based on one or more prioritizations derived from one or more responses to the one or more inquiries generated by the elicitation component 302.

In one or more embodiments, weight component 402 can assign weight values to the one or more fairness and/or utility metrics based on the one or more policy makers' responses to the inquiries to incorporate preferences into the machine learning model. For example, the weight component 402 can analyze the one or more matrices generated by the elicitation component 302 and take the eigenvector for the given matrix's largest eigenvalue as the weight value for the associate metrics. In various embodiments, by identifying the one or more policy makers' preference for each metric, the weight component 402 can combine the metrics into a single weighted metric to facilitate optimization of the machine learning model.

Figure 5:
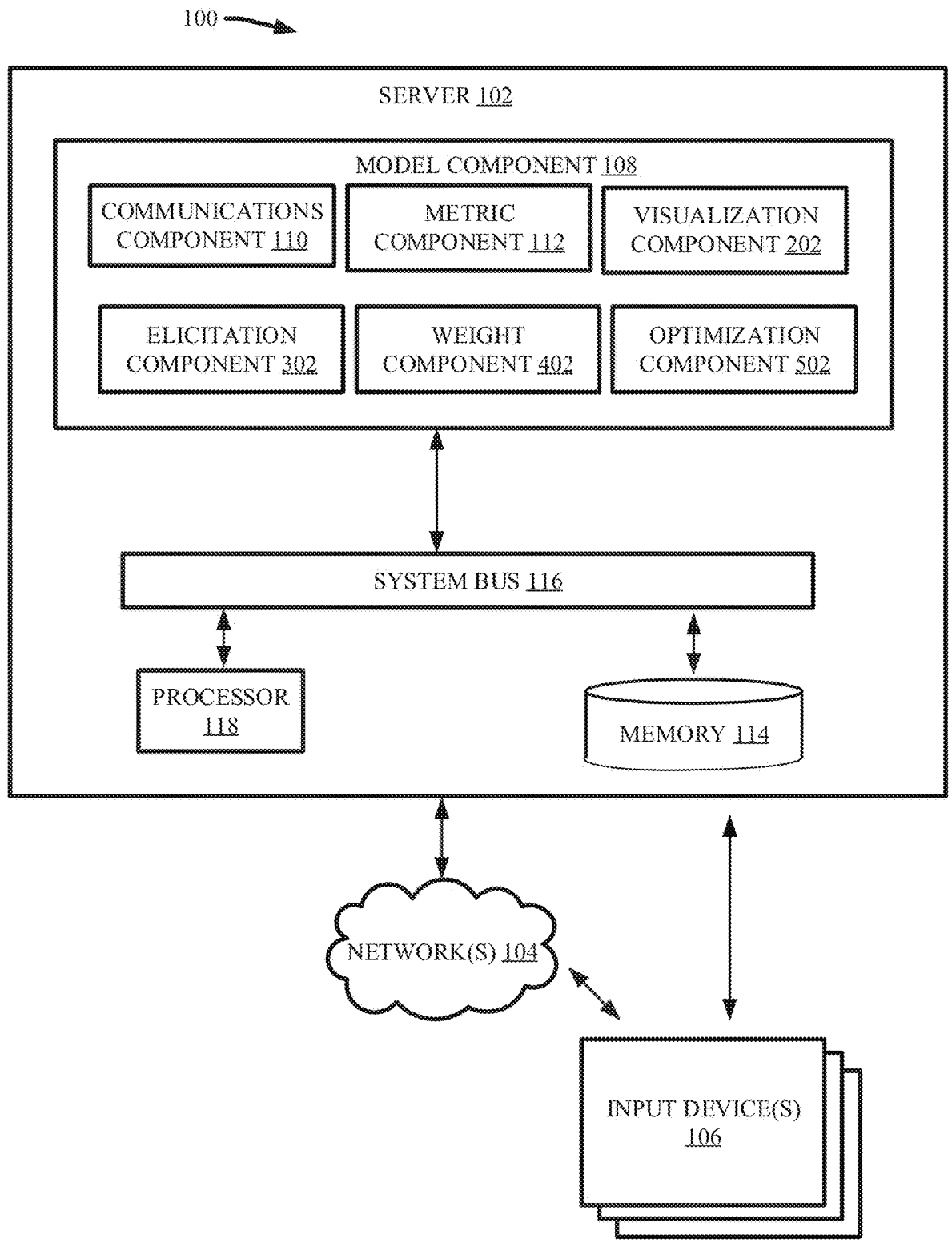
FIG. 5 illustrates a block diagram of an example, non-limiting system that can optimize a machine learning model based on one or more user preferences regarding one or more fairness metrics and/or utility metrics in accordance with one or more embodiments described herein.

FIG. 5 illustrates a diagram of the example, non-limiting system 100 further comprising optimization component 502 in accordance with one or more embodiments described herein. Repetitive description of like elements employed in other embodiments described herein is omitted for sake of brevity. In various embodiments, the optimization component 502 can execute one or more optimization algorithms to determine one or more threshold settings for the machine learning model based on the one or more weight values determined by the weight component 402. In one or more embodiments, the one or more threshold settings determined by the optimization component 502 can optimize the machine learning models for one or more fairness metrics and/or utility metrics based on preferences and/or prioritizations of the one or more policy makers.

In one or more embodiments, the optimization component 502 can determine the optimal model settings (e.g., threshold configurations) that satisfies the weight constraints (e.g., determined by the elicitation component 302 and/or weight component 402) for the task objective. For example, the optimization component 502 can combine the fairness and/or utility metrics into an objective function with the elicited weight values. For instance, wherein the metric component 112 employs SPD and/or WAOD to measure one or more fairness criteria (e.g., independency and/or separation), the optimization component 502 can derive the objective function in accordance with Equation 5 below.

$$-Util\frac{W_{util}}{S_{Util}} + |SPD|\frac{W_{SPD}}{S_{SPD}} + |WAOD|\frac{W_{WAOD}}{S_{WAOD}} \quad (5)$$

Wherein "S*" can be the scales applied to each metric in the elicitation inquires.

In various embodiments, the goal of the optimization performed by the optimization component 502 can be to find classification threshold settings for the privileged and unprivileged groups represented by the given data that minimize the objective function, wherein the relationship between the fairness and utility metrics and the threshold settings can be non-convex. Example optimization algorithms that can be employed by the optimization component 502 can include, but are not limited to: Bayesian optimization, grid optimization, evolutionary algorithms, a combination thereof, and/or the like. For instance, the optimization component 502 can execute a Bayesian optimization due to at least the available hyper-parameter tuning scenarios few assumptions about the objective function.

To exemplify one or more features of the system 100 in accordance with the various embodiments described herein, an example task objective is considered. For instance, the exemplary task objective can be a hypothetical loan approval scenario, in which a machine learning model can be employed to decide whether to grant a loan to an applicant. The machine learning model can be trained based on a part of the German Credit dataset published on the UCI Machine Learning Repository. The training dataset can have 20 attributes including a person's banking records, credit history, employment status, age, and/or the like. The dataset's label column can be arranged such that 1 represents that a person was able to repay his or her loan while 0 represents failure to repay the loan. The entire data set can comprise 1,000 instances, which can be split into a 64% training set, a 16% validation set, and a 20% test set. The test set is used to compute independence, separation, and/or utility metrics.

The machine learning model can be trained using a gradient boosting decision tree model on the dataset using the LightGBM framework. The machine learning model can achieve an accuracy of 75% when the classification threshold is set at value of 0.5. However, this threshold setting does not lead to the highest utility, which is defined as expected average profit per applicant. The dataset description indicates that a false positive error (e.g., lending money to someone who cannot repay the loan) can cost five times as much as the profit earned from a loan fully repaid. Thus, the threshold can be set much higher than 0.5 to reject more people who may not repay the loan.

The main fairness issue of the German Credit dataset is that it leads to classifiers that may disproportionately penalize young people under 26 years old (e.g., people 25 years old and younger). Among the 1,000 instances in the dataset, 190 were under the age of 26, and they were 21% less likely to get the "Good" credit rating than the rest of the population.

In accordance with various embodiments, one or more policy makers can employ the system 100 to mitigate bias in the exemplary machine learning model and/or implement one or more fairness policies. For example, the metric component 112 can employ SPD and WAOD fairness metrics. Further, the metric component 112 can employ a disparate impact ratio of less than 0.8 or greater than 1.25. The utility function can be defined by the one or more policies makers and/or retrieved from the memory 114. With regards to the exemplary task objective and machine learning model, the utility function can measure utility in terms of profit generated per loan in accordance with Equation 6 below.

$$E[\text{Profit}](TPR_p N_p + TPR_{unp} N_{unp}) - E[\text{Cost}](FPR_p N_p + FPR_{unp} N_{unp}) \quad (6)$$

Wherein "E[*]" can represent the expected average profit for a loan fully repaid or the expected average loss for a defaulted loan, and/or "N" can indicate the number of applicants in a group. Profit and costs can be assumed to be elicited from the one or more policy makers. For example, the one or more policy makers can set E[Profit] to $2,000 and E[Cost] to $10,000 to maintain a 1 to 5 ratio indicated in the data description. One of ordinary skill in the art will recognize that this exemplary utility function can be replaced with a variety of other utility functions for the given example that can account for numerous factors considered in the loan industry.

Further, the visualization component 202 can randomly sample a range of threshold settings for the classier and generate a sample set in accordance with the various embodiments described herein. The threshold settings can regard one or more classification of the data, such as age-based classifications. For instance, wherein the threshold setting is 0.6 for people younger than 26 years old and 0.7 for people older than 26; people younger than 26 can be granted a loan in response to the classifier's predicted loan-repayment probability is above 0.6, while people 26 years of age or older can be granted a loan when that probability is above 0.7. For example, the visualization component 202 can sample 10,000 pairs of thresholds and/or exclude at least a portion of the 10,000 pairs based on the disparate impact ratio.

Figure 6:
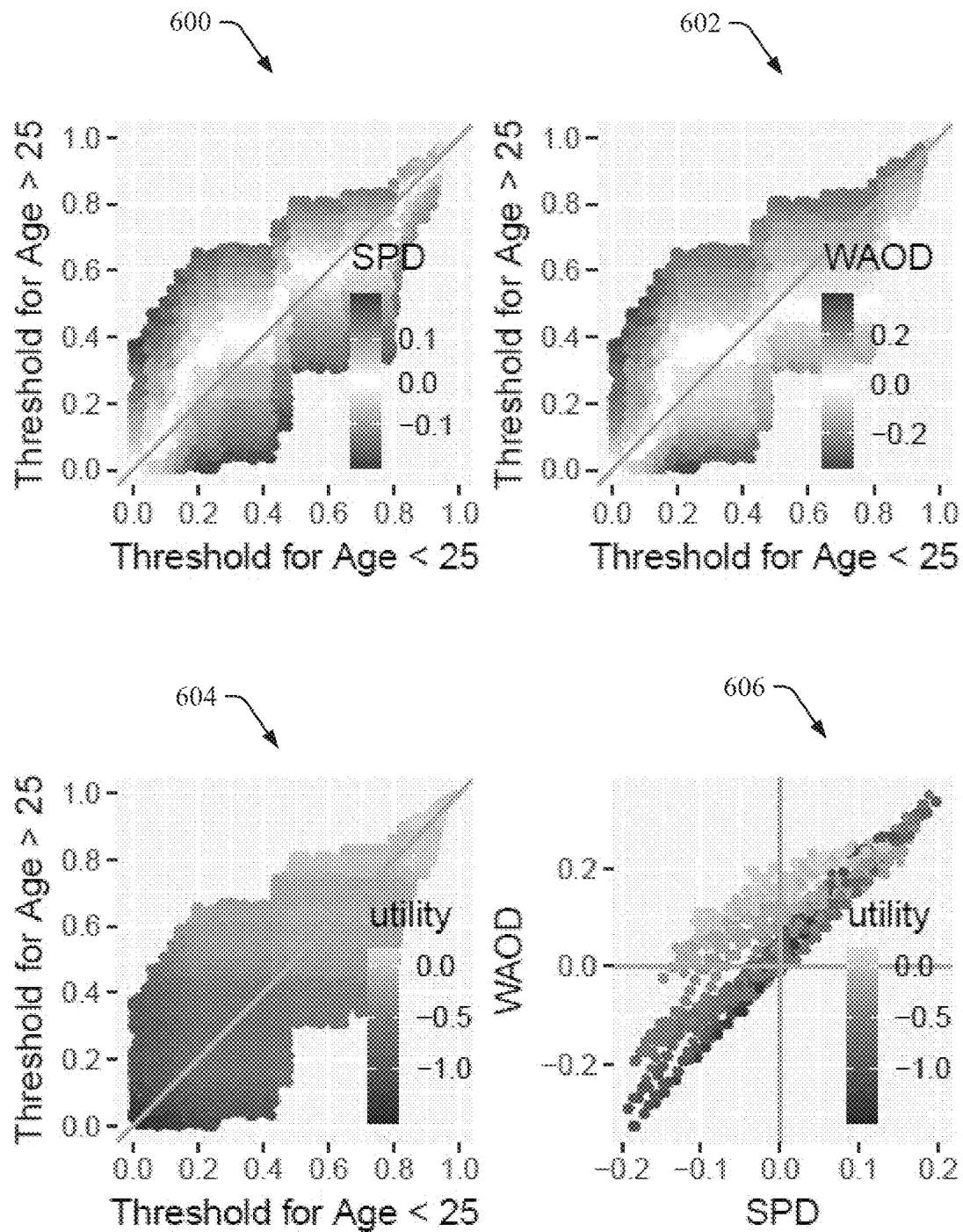
FIG. 6 illustrates a diagram of example, non-limiting visualizations that can depict a relationship between one or more fairness metrics and/or utility metrics of a machine learning model in accordance with one or more embodiments described herein.

FIG. 6 illustrates a diagram of example, non-limiting visualizations that can be generated by the visualization component 202 with regards to the exemplary machine learning model in accordance with one or more embodiments described herein. Repetitive description of like elements employed in other embodiments described herein is omitted for sake of brevity. FIG. 6 depicts four visualization that can be generated by the visualization component 202 regarding the results of the different classification threshold configurations for the exemplary machine learning model contemplated above.

The first visualization 600 and the second visualization 602 can depict how changing the thresholds impact SPD, WAOD, and/or utility. For example, one or more policy makers can infer from the first visualization 600 and/or the second visualization 602 that the classifier is likely to be biased against people younger than 26 if the classification thresholds are set to the same for the age groups younger and older than 26. For instance, the diagonal lines depicted in the first visualization 600 and/or the second visualization 602 (e.g., correlating to threshold settings) can intersect a plethora of regions of the fairness-utility space that correlate to negative SPD and WAOD values (e.g., indicating bias against the unprivileged group). Regions of the fairness-utility space correlating to SPD and/or WAOD values at or near zero can indicate fairness according to the respective metric. The first visualization 600 can show that these regions correlating to SPD and/or WAOD values at or near zero are mostly above the diagonal line; indicating that to achieve a fair classifier, the threshold for people older than 26 can be set larger than the threshold for people younger than 26.

The third visualization 604 can show where the highest utility is achieved. As shown in the third visualization 604, utility can be mostly negative for many threshold settings, but only become positive when both thresholds are above 0.8. Policy makers can view graphs like this to see how cost-benefit assumptions affect the optimal decision threshold from the utility point of view. Combined with the first visualization 600 and/or second visualization 602, one or more policy makers can also see that this high utility region is close to some fairness regions with respect to SPD and/or WAOD, suggesting that it is possible to find setting configurations with high utility and SPD fairness, but that might come with some drawback on the WAOD metric. The fourth visualization 606 removes the thresholds and directly show the relationships among the two fairness and the utility metrics.

Figure 7:
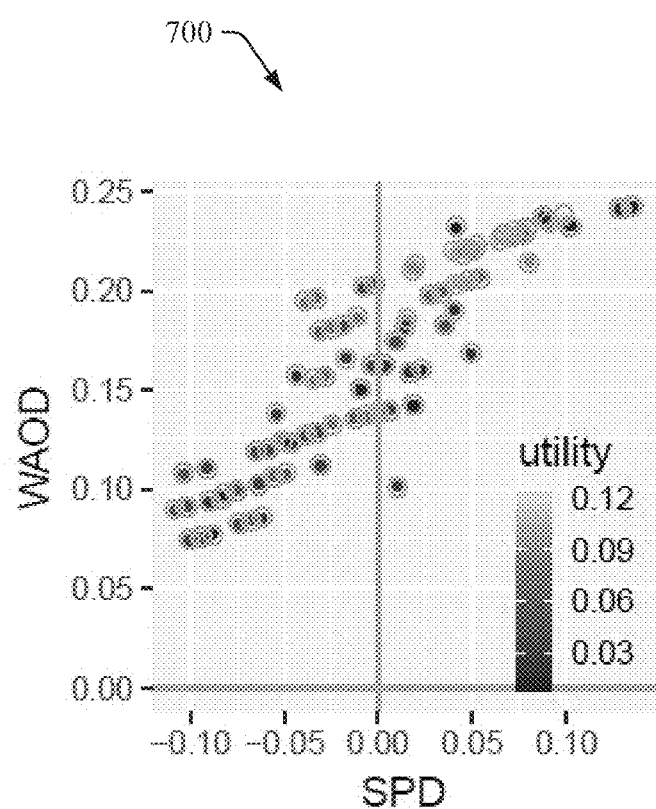
FIG. 7 illustrates a diagram of example, non-limiting visualization that can depict a relationship between one or more fairness metrics and/or utility metrics of a machine learning model in accordance with one or more embodiments described herein.

FIG. 7 illustrates a diagram of an example, non-limiting fifth visualization 702 that can be generated by the visualization component 202 with regards to the exemplary machine learning model in accordance with one or more embodiments described herein. Repetitive description of like elements employed in other embodiments described herein is omitted for sake of brevity. For example, one or more policy makers can interact with the one or more visualizations to filter one or more threshold setting configurations. For instance, the fifth visualization 702 can shows such a graph, and the one or more policy makers can see where the high utility points lie in the fairness-utility space.

FIG. 8 illustrates a diagram of a non-limiting example inquiry 802 that can be generated by the elicitation component 302 with regards to the exemplary machine learning model in accordance with one or more embodiments described herein. Repetitive description of like elements employed in other embodiments described herein is omitted for sake of brevity. For example, FIG. 8 can depict an example inquiry 802 that can be generated by the elicitation component 302 and/or presented to one or more policy makers via one or more interactive displays, such as a web interface.

FIG. 9 illustrates a diagram of an example, non-limiting table 900 that can depict one or more optimal threshold settings that can be determined by the optimization component 502 with regards to the exemplary machine learning model in accordance with one or more embodiments described herein. Repetitive description of like elements employed in other embodiments described herein is omitted for sake of brevity.

Table 900 lists optimal thresholds determined by the optimization component 502 for each preference setting and the resultant scores evaluated on the three metrics. The results shown in table 900 can demonstrate the efficacy of the optimization component 502 employing the Bayesian Optimization procedure. The utility for the maximum utility threshold setting configuration can be the largest of all four options, while "Min |SPD|" and "Min |WAOD|" respectively achieved fairness as measured by the two metrics. Table 900 suggests that the various embodiments described herein can be effective for policy makers who want to find a middle ground between fairness and model utility.

Figure 10:
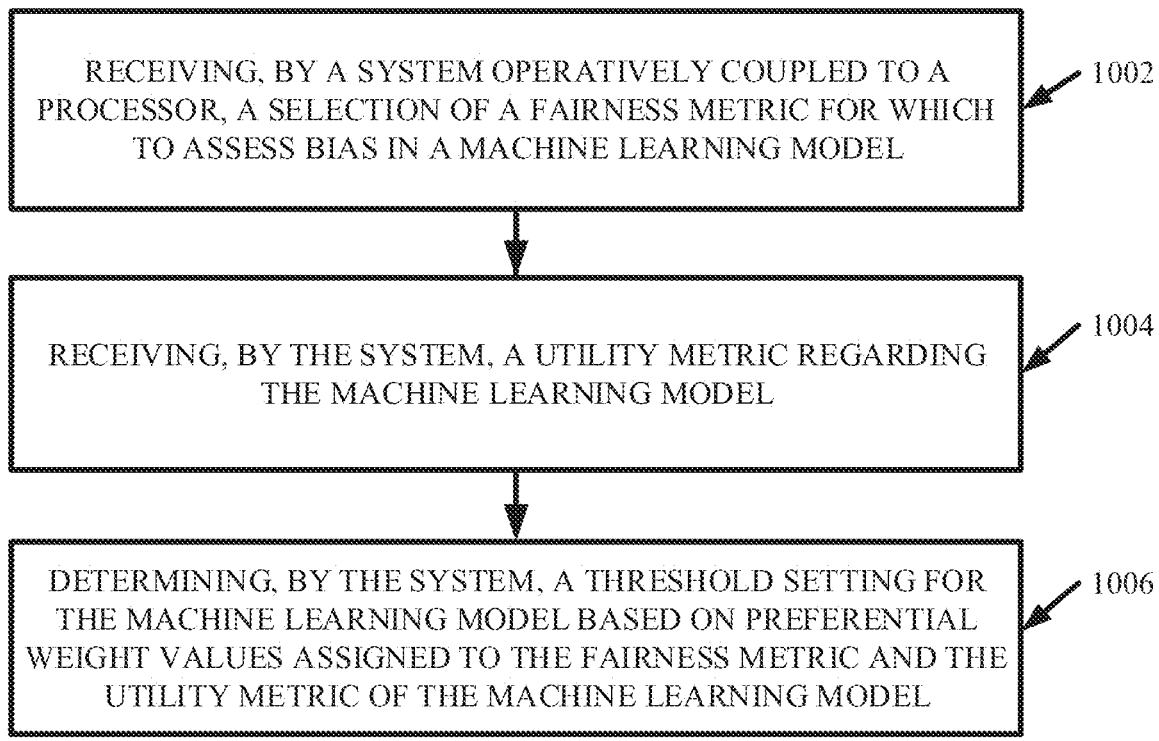
FIG. 10 illustrates a flow diagram of an example, non-limiting computer-implemented method that can facilitate mitigating bias in one or more machine learning models based on one or more user preferences regarding one or more fairness and/or utility metrics in accordance with one or more embodiments described herein.

FIG. 10 illustrates a flow diagram of an example, non-limiting computer-implemented method 1000 that can facilitate evaluating a machine learning model at a plurality of threshold settings to define a relationship between one or more fairness and utility metrics in accordance with one or more embodiments described herein. Repetitive description of like elements employed in other embodiments described herein is omitted for sake of brevity.

At 1002, the method 1000 can comprise receiving (e.g., via communications component 110), by a system 100 operatively coupled to a processor 118, a selection of one or more fairness metrics for which to analyze bias in a machine learning model. As described herein, the one or more fairness metrics can measure (e.g., via metric component 112) one or more fairness criteria of the machine learning model, such as independence and/or separation criteria. In one or more embodiments, one or more policy makers employing the machine learning model can select (e.g., via one or more input devices 106 and/or networks 104) one or more fairness metrics (e.g., from list of available fairness metrics defined by the metric component 112).

At 1004, the method 1000 can comprise receiving (e.g., via communications component 110), by the system 100, one or more utility metrics regarding the machine learning model. For example, one or more policy makers can employ one or more input device 106 to enter one or more utility functions into the system 100. Further, the one or more utility functions (e.g., comprising one or more utility metrics) can be domain specific.

At 1006, the method 1000 can comprise determining (e.g., via optimization component 502), by the system 100, one or more threshold settings for the machine learning model based on preferential weight values assigned to the fairness metric and the utility metric of the machine learning model. As described herein, in various embodiments one or more policy makers can utilize one or more visualization (e.g., generated by the system 100 via visualization component 202) to ascertain a relationship between the one or more fairness and utility metrics. Further, the one or more policy makers can provide the one or more preferential weight values based on the ascertained relationship and/or one or more inquiries (e.g., generated by the system 100 via elicitation component 302). In one or more embodiments, the determining at 1006 can comprise executing an optimization algorithm based on the one or more preferential weight values. Also, in one or more embodiments the one or more threshold setting determined at 1006 can optimize the machine learning model for one or more fairness and/or utility metrics while satisfying one or more preferences of the one or more policy makers (e.g., as delineated by the preferential weight values).

Figure 11:
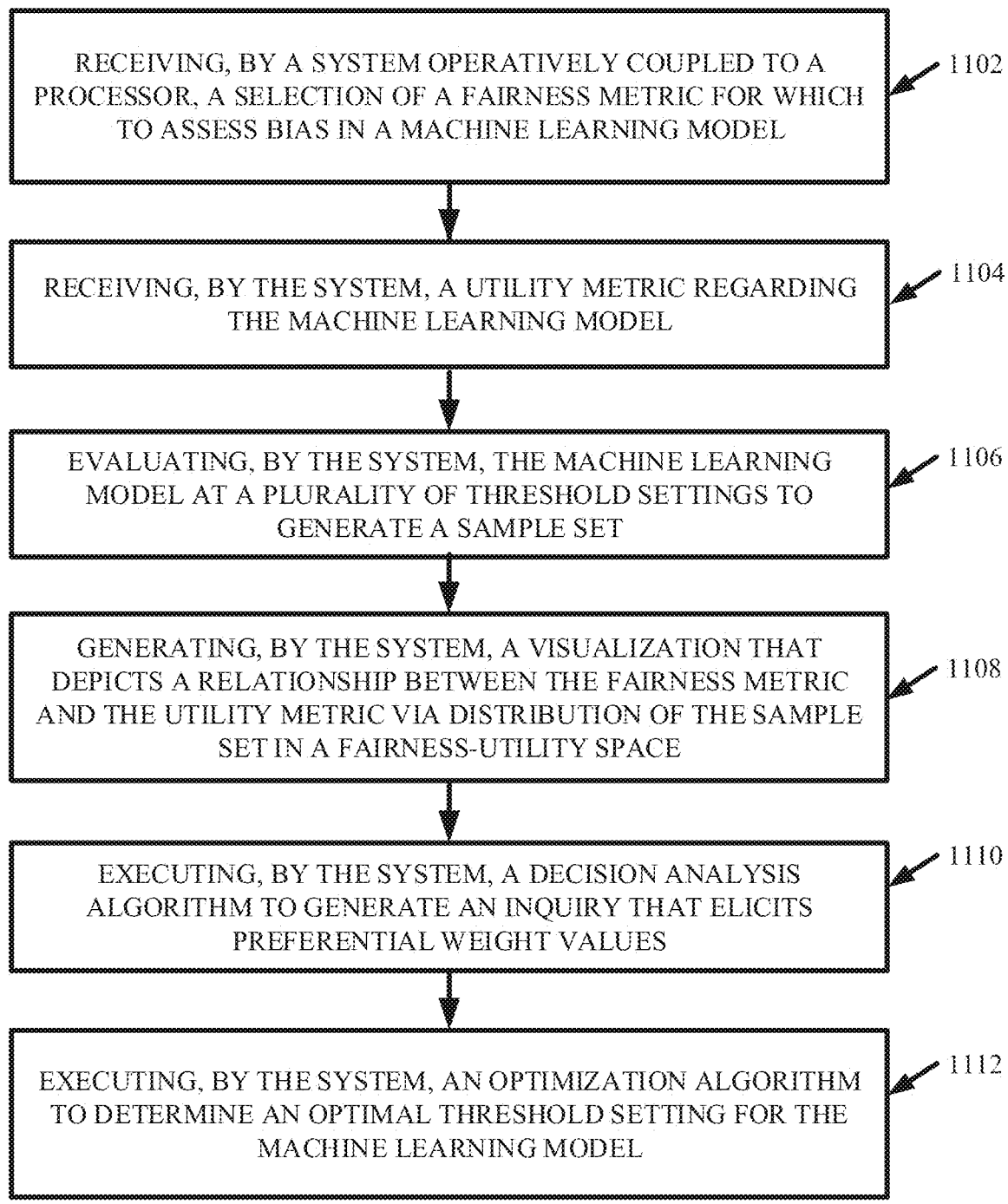
FIG. 11 illustrates a flow diagram of an example, non-limiting computer-implemented method that can facilitate mitigating bias in one or more machine learning models based on one or more user preferences regarding one or more fairness and/or utility metrics in accordance with one or more embodiments described herein.

FIG. 11 illustrates a flow diagram of an example, non-limiting computer-implemented method 1100 that can facilitate evaluating a machine learning model at a plurality of threshold settings to define a relationship between one or more fairness and utility metrics in accordance with one or more embodiments described herein. Repetitive description of like elements employed in other embodiments described herein is omitted for sake of brevity.

At 1102, the method 1100 can comprise receiving (e.g., via communications component 110), by a system 100 operatively coupled to a processor 118, a selection of one or more fairness metrics for which to analyze bias in a machine learning model. As described herein, the one or more fairness metrics can measure (e.g., via metric component 112) one or more fairness criteria of the machine learning model, such as independence and/or separation criteria. In one or more embodiments, one or more policy makers employing the machine learning model can select (e.g., via one or more input devices 106 and/or networks 104) one or more fairness metrics (e.g., from list of available fairness metrics defined by the metric component 112).

At 1104, the method 1100 can comprise receiving (e.g., via communications component 110), by the system 100, one or more utility metrics regarding the machine learning model. For example, one or more policy makers can employ one or more input device 106 to enter one or more utility functions into the system 100. Further, the one or more utility functions (e.g., comprising one or more utility metrics) can be domain specific.

At 1106, the method 1100 can comprise evaluating (e.g., via visualization component 202 and/or metric component 112), by the system 100, the machine learning model at a plurality of threshold settings to generate a sample set. At 1108, the method 1100 can comprise generating (e.g., via visualization component 202), by the system 100, one or more visualizations that can depict a relationship between the one or more fairness metrics and utility metrics via distribution of the sample set in a fairness-utility space. At 1110, the method 1100 can comprise executing (e.g., via elicitation component 302 and weight component 402), by the system 100, one or more decision analysis algorithms to generate one or more inquiries to elicit one or more preferential weight values (e.g., from one or more policy makers). At 1112, the method 1100 can comprise executing (e.g., via optimization component 502), by the system 100, one or more optimization algorithms to determine one or more optimal threshold settings for the machine learning models. Whereas conventional machine learning model optimizations can merely address a single fairness metric, various embodiments described herein, including various embodiments of method 1100, can achieve a technical improvement by jointly optimizing multiple fairness metrics as well as model utility based on the one or more priorities and/or constraints defined by the weight values.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 12:
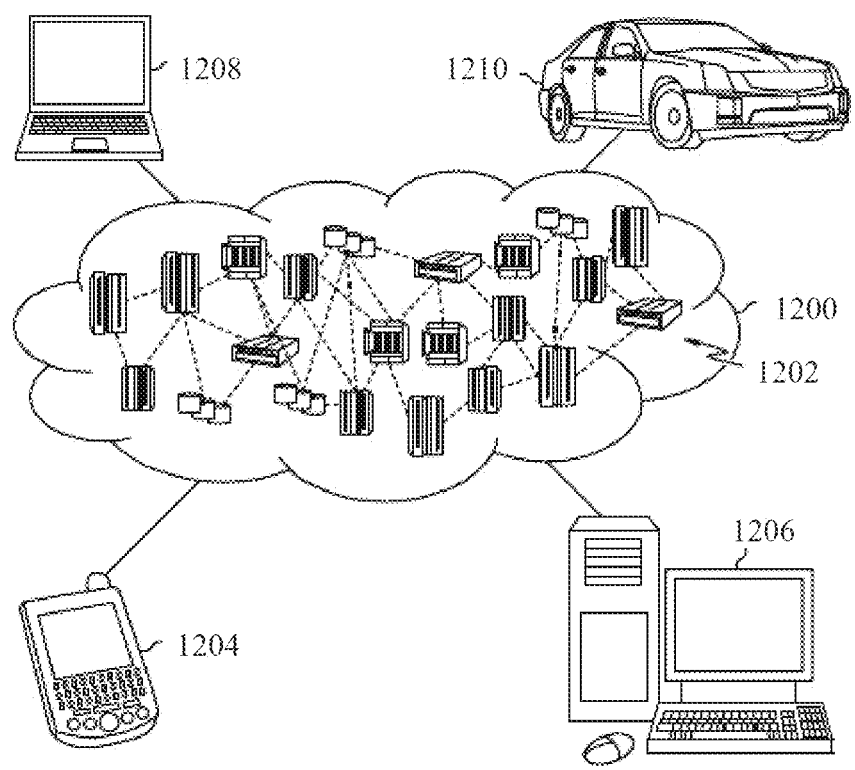
FIG. 12 depicts a cloud computing environment in accordance with one or more embodiments described herein.

Referring now to FIG. 12, illustrative cloud computing environment 1200 is depicted. As shown, cloud computing environment 1200 includes one or more cloud computing nodes 1202 with which local computing devices used by cloud consumers, such as, for example, personal digital assistant (PDA) or cellular telephone 1204, desktop computer 1206, laptop computer 1208, and/or automobile computer system 1210 may communicate. Nodes 1202 may communicate with one another. They may be grouped (not shown) physically or virtually, in one or more networks, such as Private, Community, Public, or Hybrid clouds as described hereinabove, or a combination thereof. This allows cloud computing environment 1200 to offer infrastructure, platforms and/or software as services for which a cloud consumer does not need to maintain resources on a local computing device. It is understood that the types of computing devices 1204-1210 shown in FIG. 12 are intended to be illustrative only and that computing nodes 1202 and cloud computing environment 1200 can communicate with any type of computerized device over any type of network and/or network addressable connection (e.g., using a web browser).

Figure 13:
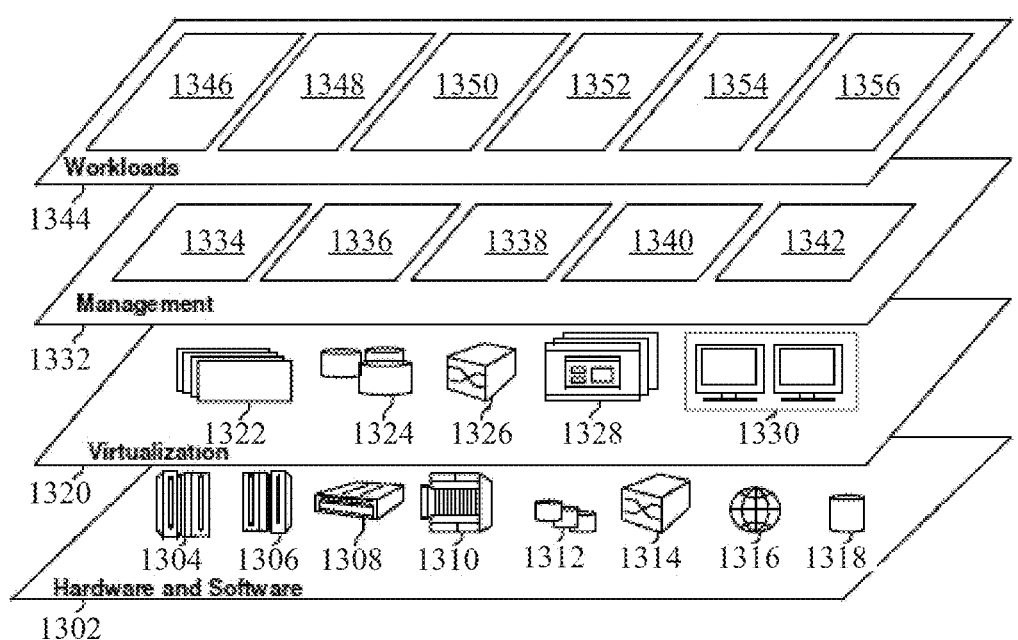
FIG. 13 depicts abstraction model layers in accordance with one or more embodiments described herein

Referring now to FIG. 13, a set of functional abstraction layers provided by cloud computing environment 1200 (FIG. 12) is shown. Repetitive description of like elements employed in other embodiments described herein is omitted for sake of brevity. It should be understood in advance that the components, layers, and functions shown in FIG. 13 are intended to be illustrative only and embodiments of the invention are not limited thereto. As depicted, the following layers and corresponding functions are provided.

Hardware and software layer 1302 includes hardware and software components. Examples of hardware components include: mainframes 1304; RISC (Reduced Instruction Set Computer) architecture based servers 1306; servers 1308; blade servers 1310; storage devices 1312; and networks and networking components 1314. In some embodiments, software components include network application server software 1316 and database software 1318.

Virtualization layer 1320 provides an abstraction layer from which the following examples of virtual entities may be provided: virtual servers 1322; virtual storage 1324; virtual networks 1326, including virtual private networks; virtual applications and operating systems 1328; and virtual clients 1330.

In one example, management layer 1332 may provide the functions described below. Resource provisioning 1334 provides dynamic procurement of computing resources and other resources that are utilized to perform tasks within the cloud computing environment. Metering and Pricing 1336 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1338 provides access to the cloud computing environment for consumers and system administrators. Service level management 1340 provides cloud computing resource allocation and management such that required service levels are met. Service Level Agreement (SLA) planning and fulfillment 1342 provide pre-arrangement for, and procurement of, cloud computing resources for which a future requirement is anticipated in accordance with an SLA.

Workloads layer 1344 provides examples of functionality for which the cloud computing environment may be utilized. Examples of workloads and functions which may be provided from this layer include: mapping and navigation 1346; software development and lifecycle management 1348; virtual classroom education delivery 1350; data analytics processing 1352; transaction processing 1354; and machine learning optimization and/or bias mitigation 1356. Various embodiments of the present invention can utilize the cloud computing environment described with reference to FIGS. 12 and 13 to elicit user preferences regarding one or more fairness metrics and/or utility metrics and/or optimize one or more machine learning models.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware based systems that perform the specified functions or acts or carry out combinations of special purpose hardware and computer instructions.

Figure 14:
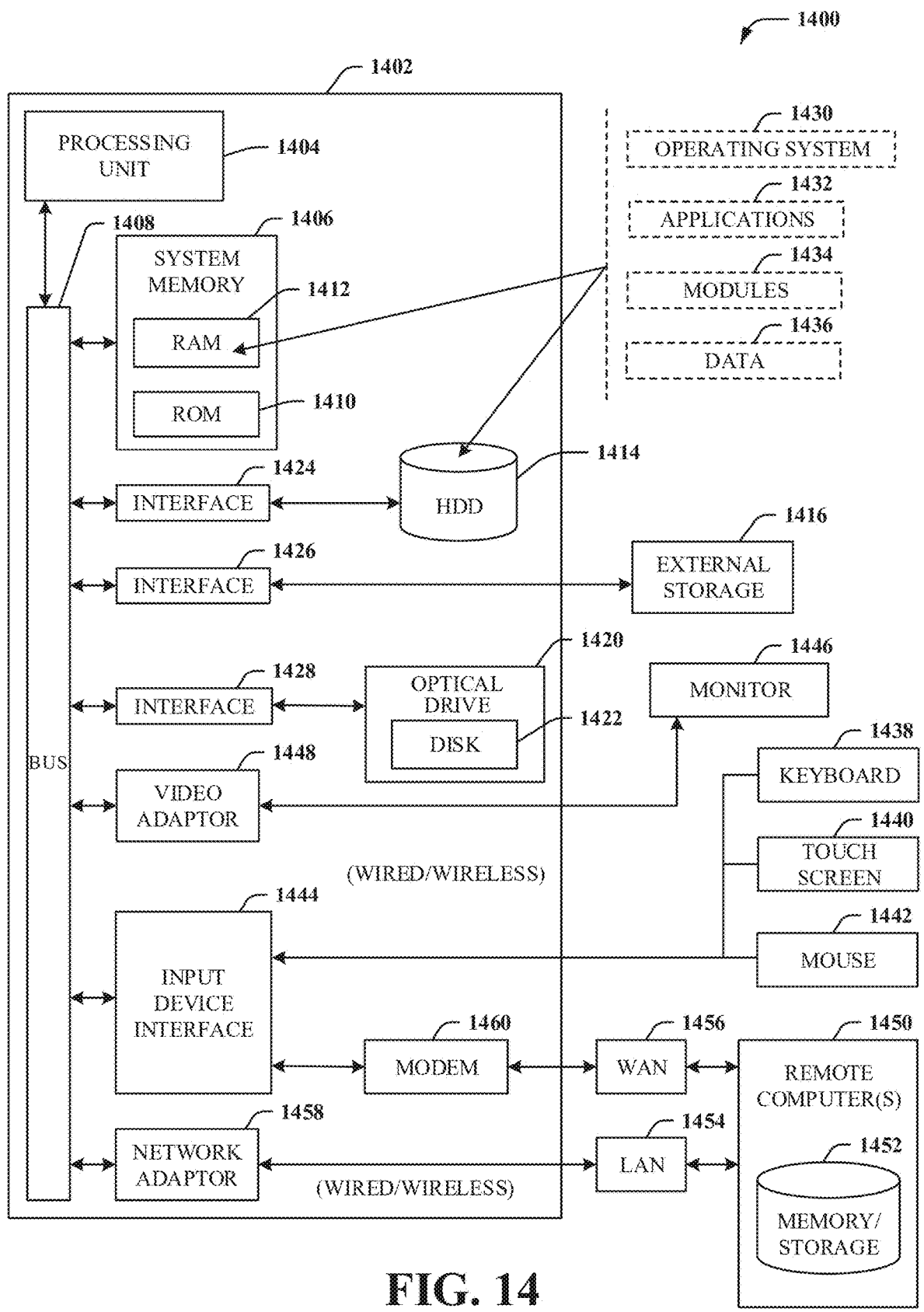
FIG. 14 illustrates a block diagram of an example, non-limiting operating environment in which one or more embodiments described herein can be facilitated.

In order to provide additional context for various embodiments described herein, FIG. 14 and the following discussion are intended to provide a general description of a suitable computing environment 1400 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things ("IoT") devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices. For example, in one or more embodiments, computer executable components can be executed from memory that can include or be comprised of one or more distributed memory units. As used herein, the term "memory" and "memory unit" are interchangeable. Further, one or more embodiments described herein can execute code of the computer executable components in a distributed manner, e.g., multiple processors combining or working cooperatively to execute code from one or more distributed memory units. As used herein, the term "memory" can encompass a single memory or memory unit at one location or multiple memories or memory units at one or more locations.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory ("RAM"), read only memory ("ROM"), electrically erasable programmable read only memory ("EEPROM"), flash memory or other memory technology, compact disk read only memory ("CD-ROM"), digital versatile disk ("DVD"), Blu-ray disc ("BD") or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 14, the example environment 1400 for implementing various embodiments of the aspects described herein includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multi-processor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 includes ROM 1410 and RAM 1412. A basic input/output system ("BIOS") can be stored in a non-volatile memory such as ROM, erasable programmable read only memory ("EPROM"), EEPROM, which BIOS contains the basic routines that help to transfer information between elements within the computer 1402, such as during startup. The RAM 1412 can also include a high-speed RAM such as static RAM for caching data.

The computer 1402 further includes an internal hard disk drive ("HDD") 1414 (e.g., EIDE, SATA), one or more external storage devices 1416 (e.g., a magnetic floppy disk drive ("FDD") 1416, a memory stick or flash drive reader, a memory card reader, etc.) and an optical disk drive 1420 (e.g., which can read or write from a CD-ROM disc, a DVD, a BD, etc.). While the internal HDD 1414 is illustrated as located within the computer 1402, the internal HDD 1414 can also be configured for external use in a suitable chassis (not shown). Additionally, while not shown in environment 1400, a solid state drive ("SSD") could be used in addition to, or in place of, an HDD 1414. The HDD 1414, external storage device(s) 1416 and optical disk drive 1420 can be connected to the system bus 1408 by an HDD interface 1424, an external storage interface 1426 and an optical drive interface 1428, respectively. The interface 1424 for external drive implementations can include at least one or both of Universal Serial Bus ("USB") and Institute of Electrical and Electronics Engineers ("IEEE") 1394 interface technologies. Other external drive connection technologies are within contemplation of the embodiments described herein.

The drives and their associated computer-readable storage media provide nonvolatile storage of data, data structures, computer-executable instructions, and so forth. For the computer 1402, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. The systems and methods described herein can be implemented utilizing various commercially available operating systems or combinations of operating systems.

Computer 1402 can optionally comprise emulation technologies. For example, a hypervisor (not shown) or other intermediary can emulate a hardware environment for operating system 1430, and the emulated hardware can optionally be different from the hardware illustrated in FIG. 14. In such an embodiment, operating system 1430 can comprise one virtual machine ("VM") of multiple VMs hosted at computer 1402. Furthermore, operating system 1430 can provide runtime environments, such as the Java runtime environment or the .NET framework, for applications 1432. Runtime environments are consistent execution environments that allow applications 1432 to run on any operating system that includes the runtime environment. Similarly, operating system 1430 can support containers, and applications 1432 can be in the form of containers, which are lightweight, standalone, executable packages of software that include, e.g., code, runtime, system tools, system libraries and settings for an application.

Further, computer 1402 can be enable with a security module, such as a trusted processing module ("TPM"). For instance with a TPM, boot components hash next in time boot components, and wait for a match of results to secured values, before loading a next boot component. This process can take place at any layer in the code execution stack of computer 1402, e.g., applied at the application execution level or at the operating system ("OS") kernel level, thereby enabling security at any level of code execution.

A user can enter commands and information into the computer 1402 through one or more wired/wireless input devices, e.g., a keyboard 1438, a touch screen 1440, and a pointing device, such as a mouse 1442. Other input devices (not shown) can include a microphone, an infrared ("IR") remote control, a radio frequency ("RF") remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1404 through an input device interface 1444 that can be coupled to the system bus 1408, but can be connected by other interfaces, such as a parallel port, an IEEE 1394 serial port, a game port, a USB port, an IR interface, a BLUETOOTH® interface, etc.

A monitor 1446 or other type of display device can be also connected to the system bus 1408 via an interface, such as a video adapter 1448. In addition to the monitor 1446, a computer typically includes other peripheral output devices (not shown), such as speakers, printers, etc.

The computer 1402 can operate in a networked environment using logical connections via wired and/or wireless communications to one or more remote computers, such as a remote computer(s) 1450. The remote computer(s) 1450 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1452 is illustrated. The logical connections depicted include wired/wireless connectivity to a local area network ("LAN") 1454 and/or larger networks, e.g., a wide area network ("WAN") 1456. Such LAN and WAN networking environments are commonplace in offices and companies, and facilitate enterprise-wide computer networks, such as intranets, all of which can connect to a global communications network, e.g., the Internet.

When used in a LAN networking environment, the computer 1402 can be connected to the local network 1454 through a wired and/or wireless communication network interface or adapter 1458. The adapter 1458 can facilitate wired or wireless communication to the LAN 1454, which can also include a wireless access point ("AP") disposed thereon for communicating with the adapter 1458 in a wireless mode.

When used in a WAN networking environment, the computer 1402 can include a modem 1460 or can be connected to a communications server on the WAN 1456 via other means for establishing communications over the WAN 1456, such as by way of the Internet. The modem 1460, which can be internal or external and a wired or wireless device, can be connected to the system bus 1408 via the input device interface 1444. In a networked environment, program modules depicted relative to the computer 1402 or portions thereof, can be stored in the remote memory/storage device 1452. It will be appreciated that the network connections shown are example and other means of establishing a communications link between the computers can be used.

When used in either a LAN or WAN networking environment, the computer 1402 can access cloud storage systems or other network-based storage systems in addition to, or in place of, external storage devices 1416 as described above. Generally, a connection between the computer 1402 and a cloud storage system can be established over a LAN 1454 or WAN 1456 e.g., by the adapter 1458 or modem 1460, respectively. Upon connecting the computer 1402 to an associated cloud storage system, the external storage interface 1426 can, with the aid of the adapter 1458 and/or modem 1460, manage storage provided by the cloud storage system as it would other types of external storage. For instance, the external storage interface 1426 can be configured to provide access to cloud storage sources as if those sources were physically connected to the computer 1402.

The computer 1402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity ("Wi-Fi") and BLUETOOTH® wireless technologies. Thus, the communication can be a predefined structure as with a conventional network or simply an ad hoc communication between at least two devices.

What has been described above include mere examples of systems, computer program products and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
    a memory that stores computer executable components; and
    a processor, operably coupled to the memory, and that executes the computer executable components stored in the memory, wherein the computer executable components comprise:
        a model component that evaluates a machine learning model at a plurality of threshold settings to generate a sample set and defines a relationship between a fairness metric and a utility metric of the machine learning model based on the sample set, wherein the plurality of threshold settings regard classification thresholds for a plurality of groups comprised within a dataset analyzed by the machine learning model.

2. The system of claim 1, wherein the fairness metric is comprised within a plurality of fairness metrics, and wherein the system further comprises:
    a metric component that defines the fairness metric as an independence criterion of the machine learning model, and wherein the metric component further defines a second fairness metric from the plurality of fairness metrics as a separation criterion of the machine learning model.

3. The system of claim 2, wherein the metric component defines the utility metric from a utility function regarding a task objective of the machine learning model.

4. The system of claim 2, further comprising:
a visualization component generates a visualization depicting a distribution of the sample set as a function of one or more of the plurality of fairness metrics, wherein the relationship is a trend in the distribution.

5. The system of claim 4, further comprising:
an elicitation component that executes a decision analysis algorithm to generate an inquiry regarding a prioritization of the plurality of fairness metrics and the utility metric.

6. The system of claim 5, further comprising:
a weight component that determines weight values for the plurality of fairness metrics and the utility metric based on the prioritization derived from a response to the inquiry.

7. The system of claim 6, further comprising:
an optimization component that determines a threshold setting for the machine learning model based on the weight values.

8. The system of claim 7, wherein the threshold setting optimizes the machine learning model for at least one member selected from the group consisting of the fairness metric, the second fairness metric, and the utility metric.

9. A computer-implemented method, comprising:
determining, by a system operatively coupled to a processor, a threshold setting for a machine learning model based on preferential weight values assigned to a fairness metric and a utility metric of the machine learning model;
executing, by the system, a decision analysis algorithm to generate an inquiry that elicits the preferential weight values.

10. The computer-implemented method of claim 9, further comprising:
executing, by the system, an optimization algorithm to determine the threshold setting.

11. The computer-implemented method of claim 10, wherein the decision analysis algorithm is selected from a group consisting of an analytic hierarchy process, a conjoin analysis, a simple multi-attribute rating technique (SMART), direct weighting, SMART exploiting ranks, and SMART using swings.

12. The computer-implemented method of claim 10, wherein the optimization algorithm is selected from a group consisting of a Bayesian optimization, a grid optimization, and an evolutionary algorithm.

13. The computer-implemented method of claim 10, further comprising:
evaluating, by the system, the machine learning model at a plurality of threshold settings to generate a sample set; and
generating, by the system, a visualization that depicts a relationship between the fairness metric and the utility metric via a distribution of the sample set in a fairness-utility space.

14. The computer-implemented method of claim 13, wherein the fairness metric measures an independence criterion of the machine learning model, wherein the fairness metric is comprised within a plurality of fairness metrics, and wherein a second fairness metric from the plurality of fairness metrics measures a separation criterion of the machine learning model.

15. A computer program product for mitigating bias in a machine learning model, the computer program product comprising a computer readable storage medium having program instructions embodied therewith, the program instructions executable by a processor to cause the processor to:
evaluate, by the processor, the machine learning model at a plurality of threshold settings to generate a sample set and define a relationship between a fairness metric and a utility metric of the machine learning model based on the sample set; and
define, by the processor, the fairness metric from the fairness metric as an independence criterion of the machine learning model.

16. The computer program product of claim 15, wherein the fairness metric is comprised within a plurality of fairness metrics, wherein the program instructions further cause the processor to:
define, by the processor, a second fairness metric from the plurality of fairness metrics as a separation criterion of the machine learning model.

17. The computer program product of claim 16, wherein the program instructions further cause the processor to:
generate, by the processor, a visualization depicting a distribution of the sample set as a function of one or more of the plurality of fairness metrics, wherein the relationship is a trend in the distribution.

18. The computer program product of claim 17, wherein the program instructions further cause the processor to:
execute, by the processor, a decision analysis algorithm to generate an inquiry regarding a prioritization of the plurality of fairness metrics and the utility metric; and
determine, by the processor, weight values for the plurality of fairness metrics and the utility metric based on the prioritization derived from a response to the inquiry.

19. The computer program product of claim 18, wherein the program instructions further cause the processor to:
determine, by the processor, a threshold setting for the machine learning model based on the weight values, wherein the threshold setting optimizes the machine learning model for at least one member selected from the group consisting of the fairness metric, the second fairness metric, and the utility metric.

* * * * *